Nov. 30, 1948.　　　　　　　　　　E. H. LAND　　　　　　　　2,455,126
　　　　　　　　　APPARATUS FOR EXPOSING AND PROCESSING
Filed July 12, 1946　　　　　　　PHOTOGRAPHIC FILM
　　　　　　　　　　　　　　　　　　　　　　　　　　2 Sheets-Sheet 1

INVENTOR
Edwin H. Land
BY
Donald L. Brown
Attorney

Nov. 30, 1948.  E. H. LAND  2,455,126
APPARATUS FOR EXPOSING AND PROCESSING
PHOTOGRAPHIC FILM
Filed July 12, 1946  2 Sheets-Sheet 2
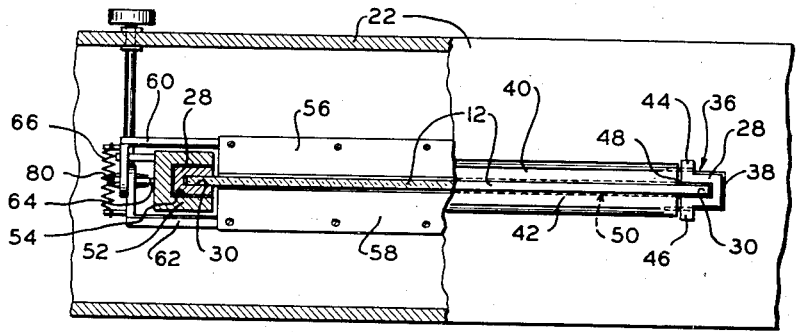
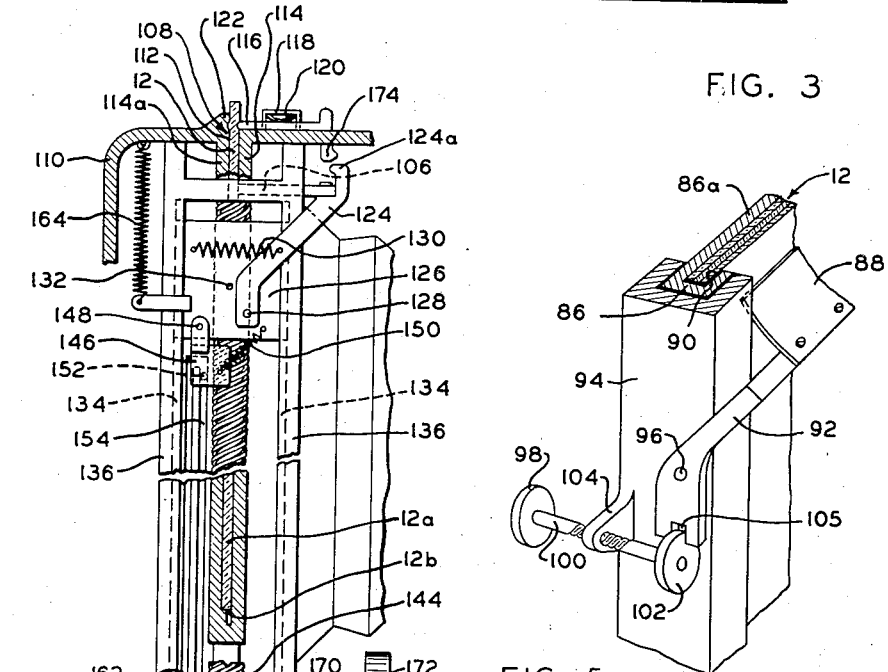
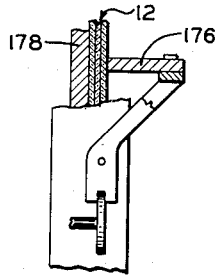
INVENTOR
Edwin H. Land
BY
Donald L. Brown
Attorney Patented Nov. 30, 1948

2,455,126

UNITED STATES PATENT OFFICE 2,455,126

APPARATUS FOR EXPOSING AND PROCESSING PHOTOGRAPHIC FILM

Edwin H. Land, Cambridge, Mass., assignor to Polaroid Corporation, Cambridge, Mass., a corporation of Delaware Application July 12, 1946, Serial No. 682,979

21 Claims. (Cl. 95—13)

This invention relates to photography and more particularly to apparatus for processing a photographically exposed film by applying mechanical stress to predetermined areas thereof.

An object of the present invention is to provide novel apparatus for use in conjunction with photographically exposed multilayer film comprising a photosensitive layer and a fluid interposed between a pair of layers of the film for forming visible positive photographic images therein.

Another object of the invention is to provide pressure applying elements for subjecting pre-established areas of a multilayer photographic film to mechanical stress to spread a processing fluid between a pair of layers of the film.

A further object of the invention is to provide means associated with nonrotatable pressure applying elements for actuating their operation and for defining the area of said operation.

Still another object of the invention is to provide relatively simple camera apparatus wherein given elements serve both to position the photosensitive area of a film in the focal plane for photographic exposure, and to establish the film in correct position for initiating subjection of predetermined portions thereof to pressure applying means fixed against rotation and adapted to process the film.

A still further object of the invention is to provide compact camera apparatus comprising pressure applying means fixed against rotation for processing a photographic film, said means being operable while the film is positioned in the focal plane.

A further object of the invention is to provide a light-shielded aperture in the camera casing, means for photographically exposing a film introduced through the aforementioned aperture, elements fixed against rotation for applying a progressive pressure to the film, and means for withdrawing or ejecting the film through the aperture.

Still another object of the invention is to provide a film holder which is adapted both to maintain the film in the focal plane for effecting its photographic exposure and to hold the film in a plane wherein uniform pressure may be applied across successive film portions through pressure applying means fixed against rotation.

Yet another object of the invention is to provide a pair of convergingly biased plate-like elements for applying a predetermined pressure to opposite surfaces of a multilayer film material lying within a plane between said elements and having a fluid interposed between a pair of its layers, movement of either the pressure applying elements or film material in the aforementioned plane causing an application of directional pressure to the film and fluid contained therewithin whereby the fluid is spread between pre-established layer portions.

A still further object of the invention is to provide a pair of convergingly biased plate-like elements for applying a predetermined pressure to opposite surfaces of a multilayer film material having a fluid releasably contained between a pair of its layers, the plate-like elements being of a length adapted to extend across the film in one direction but being of a width less than the dimension of the film in another direction, and the film being disposed in a plane such that movement of either the pressure applying elements or film material in the aforementioned plane and in a direction perpendicular to the longitudinal dimension of the plate-like elements causes applications of progressive pressure to the film and release and spreading of the fluid between its layers.

Another object of the invention is to provide a carrier for moving a film material longitudinally in a plane between a pair of convergingly biased plate-like pressure applying elements extending transversely across at least part of the film, the carrier comprising portions adjacent the edges of the film for preventing its lateral movement in the aforementioned plane and portions overlapping the film for preventing displacement of the film from said plane.

A further object of the invention is to provide a pair of convergingly biased plate-like elements extending transversely across at least a portion of a film material lying in a plane between said elements and adapted to engage the film material, the forementioned elements having means associated therewith for actuating their disengagement from the film.

Still another object of the invention is to provide novel camera apparatus having a rigid plate for supporting a photographic film material having a fluid interposed between a pair of its layers, the plate being adapted to support the film material in the focal plane and a pressure blade mounted to extend transversely across at least part of the film and biased for applying pressure to the film, movement of either the blade or film along the aforementioned planar area serving to distribute an application of pressure across the film and to spread the fluid between layers of the film.

A still further object of the invention is to provide novel camera apparatus having a rigid plate for supporting a photographic film material having a fluid releasably contained between a pair of its layers, the plate being adapted to support both a portion of the film in the focal plane and another portion of the film in an extension of the focal plane, and a pressure blade so mounted and of such length as to extend transversely across at least part of the film and biased for applying pressure to the film, movement of either the blade or film along the aforementioned planar areas in a direction perpendicular to the longitudinal dimension of the blade serving to distribute an application of pressure across the film and to cause release and spreading of the fluid between layers thereof.

Yet another object of the invention is to provide in camera apparatus adapted to process a multilayer photographic film having a fluid interposed between a pair of its layers, an element fixed against rotation and having a contacting surface parallel to a surface of the film, said element being adapted to apply pressure to successive non-fluid-bearing surface areas of the film for spreading the fluid between its layers.

Still another object of the invention is to provide in camera apparatus adapted to process a multilayer photographic film having a fluid interposed between a pair of its layers, an element fixed against rotation and having a contacting surface parallel to a surface of the film, said element being adapted to withstand pressure of successive non-fluid-bearing surface portions of the film thereagainst for spreading the fluid between the aforementioned layers.

Further objects of the invention are the provision, in camera apparatus adapted to photographically expose and process a multilayer fluid-containing film, of film holding means engaging non-fluid-containing portions of the film, and of means for governing the speed at which successive portions of the film and at least a pressure applying element fixed against rotation are brought into contact with one another.

These and other objects of the invention will in part be obvious and will in part appear hereinafter.

The invention accordingly comprises the construction, combination of elements, and arrangement of parts which are exemplified in the apparatus hereinafter described, and the scope of the application of which will be indicated in the claims.

In the drawings, wherein like reference characters refer to like parts throughout the several views:

Fig. 2 is a fragmentary top-plan view, partly in section, the section being taken along the line 2—2 of Fig. 1;

Fig. 3 is a fragmentary perspective view of a modification of the film holding and pressure applying elements of Fig. 1;

Fig. 4 is a schematic, side-elevation view, partly in cross-section, of a further modification of the film holding and pressure applying elements of Fig. 1; and Fig. 5 is a fragmentary side-elevation view, partly in cross-section, of a modification of the pressure applying elements of Fig. 3.

Figure 1:
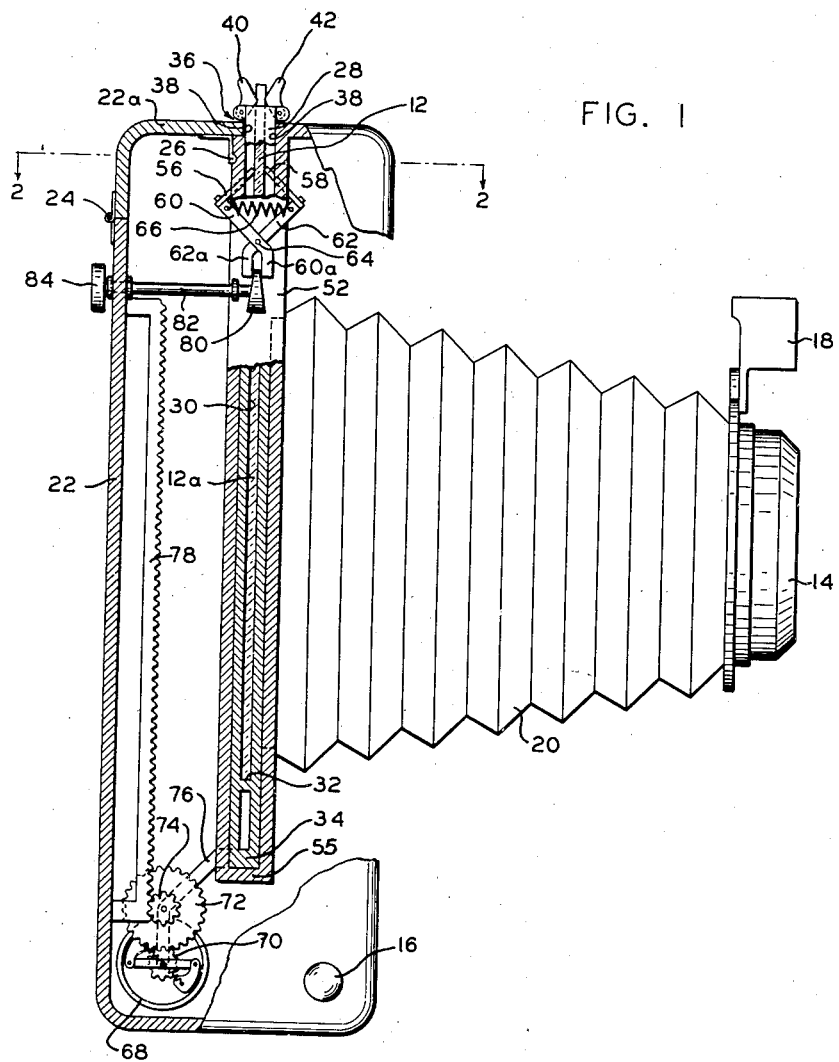
Figure 1 is a somewhat schematic side-elevation view, partly in cross-section and with parts broken away, of one form of the novel camera apparatus of the invention.

Camera apparatus of the invention is designed for use in conjunction with multilayer photographic film assemblages of the type disclosed in my copending application, Serial No. 576,254, filed February 5, 1945, now abandoned, for Photographic process, apparatus and product, such as a composite film comprising a photosensitive layer and having a viscous fluid releasably contained between a pair of layers thereof. After its photographic exposure, the film is adapted to subjection to mechanical stress preferably progressively applied thereto as, for example, to being passed over or between pressure applying elements or to undergoing the passage of one or more pressure applying elements across pre-established surface areas thereof, said operations being employed for release of the fluid between the aforementioned layers and spreading of the fluid over the aforesaid areas. Upon spreading of the fluid over the photographically exposed photosensitive area said area is permeated by the fluid and a visible positive image of the subject image is formed upon a layer of the film as described in my copending application, above referred to.

In the drawings, detail of film structure is omitted as unessential to the present invention, the film 12 generally being shown as a unitary structure. It is to be understood however that the film actually comprises several layers, as indicated in Fig. 3, a fluid being releasably contained between a pair of said layers at a position adjacent image area portions thereof but out of contact therewith, the fluid being suitably placed for release to and spreading over said portions. Thus, in Figs. 1 and 4 where film 12a is shown as positioned in the focal plane of the camera the fluid containing portion thereof, prior to release and spreading of the fluid, would be positioned immediately above the upper edge of the focal plane. Although film material of the type schematically indicated in the drawings represents a laminated composite film structure comprising a transparent base layer for carrying the photosensitive layer or, alternatively, a transparent image carrying layer positioned between the photosensitive layer and camera lens 14 through which transparent layer the photosensitive layer is photographically exposed, pressure applying elements of the invention are adapted to incorporation in modified camera apparatus suitable for use with other types of film such as roll film, a film pack, and a film structure permitting direct exposure of the photosensitive layer and its subsequent superimposition with a positive image carrying layer.

As shown in Fig. 1, elements more particularly related to photographic exposure of the film comprise the aforesaid lens 14, shutter release 16, viewfinder 18, and bellows 20, it being understood that suitable shutter and lens aperture regulating means as well as means for effecting extension and collapse of the bellows, and adjusting focus, not shown, are incorporated in the camera. Further elements of the camera apparatus are enclosed in a light-tight chamber provided by casing 22, said casing having at least a portion 22a pivotally attached thereto by means of hinge 24 and having friction latch 26 for gaining access to the interior of the camera.

Means for introducing film 12 into the camera, for positioning said film for photographic exposure and processing, and for withdrawing the film from the camera during processing and formation of a positive visible image therein are provided by a film carrier 28 (Figs. 1 and 2). The carrier comprises a pair of elements providing channels 30 for engaging longitudinal edge portions of the film and for overlapping and engaging longitudinal marginal portions thereof thus holding the film firmly in said carrier. A crossbar 32 interconnects said pair of channeled elements and provides a limit stop for the leading edge of the film when it is inserted in the carrier. A second crossbar 34 interconnects non-channeled portions of the film carrier, providing additional rigidity thereto and serving as a limit stop for positioning the carrier in the camera as will presently be described. The light sensitive film may be mounted in the carrier through any conventional procedure as, for example, the film may be supplied with a light-tight paper covering having a tab adjacent an end thereof and said covering may be manually withdrawing after insertion of the film in the camera.

End portions of film carrier 28 project through a pair of apertures 36 (Figs. 1 and 2) formed in the camera casing, said apertures being provided with suitable light-shielding strips 38 such as strips of a velvet material. Two film clamping elements 40 and 42 are pivotally mounted on lugs 44 and 46, respectively, said lugs being integral with the carrier at its extremities, the clamping elements serving both as means for manually withdrawing the carrier through the camera casing and for providing additional holding means for maintaining the position of the film in the carrier while said carrier is being withdrawn. Light-shielding strips 48 (Fig. 2) are provided adjacent a slot 50 formed in the camera casing and interconnecting the aforementioned apertures 36, that portion of the film intervening between film portions mounted in the film carrier passing through said slot. Casing portion 22a is preferably opened in inserting the film in the camera and closed only after insertion of the fluid-containing portion thereof to prevent premature stress upon said portion.

Carrier 28 is slidably mounted in a pair of guide elements 52 (one of said elements being shown) rigidly attached to the camera casing, said guides comprising channels 54 within which the carrier may be moved longitudinally. Crossbar 55 interconnects said guide elements 52 at one extremity and serves as a limit stop for crossbar 34 of the carrier whereby the position of maximum insertion of the carrier within the camera is determined. The aforesaid arrangement of guide elements 52 and film carrier 28 provides means for positioning the film in the focal plane, for holding the film substantially rigidly in said plane, and for carrying the film along an extension of said plane while it is undergoing processing and withdrawal from the camera. It will be apparent that said means are particularly adapted to a substantially rigid film material or to a film which may be impaired by bending.

A pair of plate-like elements 56 and 58, having contacting surface portions parallel to and of such length as to extend substantially across the film, are mounted at each end thereof upon a pair of arms 60 and 62, respectively. Said arms, in turn, are mounted coaxially adjacent their end portions upon guide elements 52 by pivot pins 64 and are convergingly biased, through action of a pair of springs 66 attached to said arms, in such manner as to apply pressure to diametrically opposite film surface portions lying between channeled portions of film carrier 28, said springs being designed for causing said elements 56 and 58 to apply a predetermined pressure to the film. It will thus be apparent that when film carrier 28 and a photographically exposed film 12 mounted therein are drawn through the camera casing in a direction causing said film to move past said elements 56 and 58, the film is progressively subjected to pressure imparted by said elements 56 and 58, the aforesaid combination of elements providing means for releasing and spreading the aforementioned fluid between preestablished layer portions of the film as hereinbefore described. As shown in Fig. 1, the film is moved to a position exterior of the casing during its processing but, where it is required that the film be withheld from exposure to actinic light during its processing, it is to be understood that the longitudinal dimensions of nonphotosensitive portions of the film and of the carrier, carrier guide, and camera casing may be increased whereby processing may be completed prior to movement of the photosensitive portion of the film exteriorly of said casing.

It is desirable that spreading of the fluid be accomplished in such manner as to provide a predetermined and substantially constant thickness thereof throughout layer surfaces affected. Means for the purpose comprise a governor 68 and suitable gearing 70, 72, and 74 mounted on an arm 76 which, in turn, is rigidly connected to film carrier 28, said gear 74 engaging a rack 78 rigidly attached to the camera casing, and being caused to rotate through its movement along said rack when the film holder is withdrawn and, in turn, causing rotation of said gears 72, 70, and rotatable elements of the governor. Although not shown, it is preferable that a ratchet and pawl be employed to provide an operative connection between gears 74 and 72 only when film carrier 28 is withdrawn through the camera casing so that the carrier may be moved in an opposite direction without actuating the governor mechanism.

When a film unit is to be inserted in film carrier 28 it is required than an unobstructed passage be provided therefor. Accordingly, film clamping elements 40 and 42 may be pivotally rotated to an idle position out of contact with the film and in contact with the camera casing. Means are also provided for separating pressure applying elements 56 and 58 from the film, said means comprising extended portions 60a and 62a of arms 60 and 62, respectively. Said portions 60a and 62a comprise followers which may be altered as to their degree of relative separation through contact with a wedge-like cam 80 interposed therebetween, said cam being connected by shaft 82, passing through casing 22 to a knob 84 exterior of said casing whereby the cam may be rotated. It will be apparent that the interaction of said cam and followers selectively permits engagement or disengagement of pressure applying elements 56 and 58 with film 12. Operation, in brief, comprises the following steps: film is inserted in carrier 28; the carrier, in turn, is inserted in channeled elements 52; the film is then photographically exposed; and the carrier, holding the film, is withdrawn from the camera, the film being processed coincidentally. Positive image bearing portions may then be stripped from other portions of the film for viewing or may be viewed directly through a transparent layer according to the construction of the film.

The modification of pressure applying elements illustrated in Fig. 3 shows a film carrier 86 comprising a plate portion 86a extending across an entire surface of the film, said portion 86a providing a rigid area for withstanding pressure applied to an opposite surface of the film. Pressure applying means comprise a pressure blade 88 formed, for example, of a resilient metal or of a metal core surfaced with rubber or some other suitable resilient material, the blade extending across the surface of the film between channeled portions 90 of the film carrier, with its contacting edge parallel to said film surface. Blade 88 is mounted upon an arm 92 which inturn is rotatably mounted adjacent each extremity thereof upon carrier guide elements 94 by means of pivot pins 96 (one guide element and pivot pin only being shown). Engagement or disengagement of the pressure blade with film 12 is selectively obtained by turning knob 98, causing forward or rearward movement of shaft 100 and annular disk element 102 attached thereto by reason of a threaded engagement of shaft 100 within stud 104, said disk engaging a slot 105 formed within the extremity of arm 92. It will be apparent that the modified constructions shown in Fig. 3 are suitable for embodiment in the camera of Fig. 1.

The modification of Fig. 4 shows a translationally movable pressure applying plate-like element 106 formed, for example, from a rigid metal strip or from a resilient strip of metal or other suitable material extending transversely across the film and means for moving said element longitudinally across a surface of a film unit 12 of the character described, said film being held stationary within the camera. Other modified elements shown comprise means for actuating said movement of the pressure applying element, for controlling the speed of movement thereof, for returning said element to operative position, for separating said element from the film, and for gripping or clamping the film during frictional contact of pressure applying element 106 therewith.

An aperture 108 formed in casing 110 and having suitable light-shielding strips 112 contiguous therewith is provided whereby film 12 may be inserted within or withdrawn from the camera. A film holder 114 is rigidly attached to the camera casing, said holder extending within the camera from aperture 108 and being substantially similar in form to film carrier 86 of Fig. 3 whereby channeled elements engage longitudinal edge and marginal portions of the film and a rigid plate portion 114a (Fig. 4) is provided against which one surface of the film may bear. The film unit, as shown, is suitably positioned in the camera for photographic exposure and processing thereof with portions 12a lying in the focal plane. A device for locking the film in said position is provided by a rigid plate 116, said plate preferably being of a width equal to that of the film and being slidably movable toward or away from the film through guide means 118 frictionally engaging said plate and comprising a contacting spring element 120, the convex extremity of said strip being adapted to cooperate with a concavity in an outwardly extending portion 122 of the casing. Plate 116 also provides light-shielding means along areas of engagement with the film.

Pressure applying element 106 is attached to an arm 124, said arm, in turn, being rotatably mounted adjacent each extremity upon a carrier 126 by means of a pivot pin 128. Pressure applying bias of element 106 is imparted thereto by a pair of springs 130 attached to carriers 126 and arm 124, respectively. A stop pin 132 is mounted on each carrier, said pins being so positioned relative to arm 124 as to permit unrestricted contact of element 106 with the film but to prevent contact of said element 106 with the rigid plate portion 114a of film holder 114. Carriers 126 are longitudinally movable along tracks 134 provided within fixed members 136, said tracks extending parallel to the focal plane.

Referring to the relative position of elements in Fig. 4, actuation of the carriers downwardly and the passage of pressure applying element 106 across the film is accomplished in the following manner. Handcrank 138 is rotated in a counterclockwise direction, bevel gear 140 engaging bevel gear 142 and causing worm 144 to rotate in a clockwise direction. Worm 144 engages nut segment 146, pivotally attached to carrier 126 by pin 148 and biased toward said engagement with worm 144 by spring 150. Rotation of worm 144 causes downward travel of threaded nut segment 146 and elements attached thereto. A pin 152 extends inwardly from said nut segment 146, said pin riding in a longitudinally formed slot 154 and eventually entering a horizontal slot 156 formed in a horizontally movable arm 158 thereby limiting further travel of the aforesaid elements. At said position of elements, forward portions of pressure applying element 106 are caused to pass under the leading edge 12b of film 12. After entrance of said pin into slot 156, button 160 may be depressed, causing actuation of suitable linkage and, thereby, horizontal movement of arm 158, slot 156 therein, and pin 152 in a direction to the left. Accordingly, nut segment 146 is withdrawn from engagement with worm 144 and pin 152 is suitably disposed for upward travel along a second longitudinal slot 162. The aforesaid elements are biased for a return to maximum upward position by spring 164 attached, respectively, to the carrier and camera casing. Maximum downward speed of travel of the aforesaid elements may be controlled by a conventional gear train and governor, said speed control device comprising bevel gear 166 engaging bevel gear 140 and spur gears 168 and 170 causing actuation of rotatable elements of governor 172. It will be obvious that certain of the elements shown for driving the carriers and for effecting a return to upward position thereof are preferably to be duplicated adjacent the opposite edge of the film, not shown, for obtaining an evenness of movement of element 106 across the film surface. Alternatively, a single worm and associated mechanism connecting with the carriers, as shown, could be placed rearwardly and centrally of the rigid plate portion 114a of the film holder 114.

Upon release of film locking device 116 the film may either be manually withdrawn permitting pressure applying element 106 to follow said film upwardly as actuated by spring 164 or, provided said spring is of sufficient strength for the purpose said element 106 may serve to propel the film upwardly and to cause its substantial ejection from the camera, it being understood that the film is retained in the camera until completion of its processing. When arm 124 approaches a point of maximum upward travel, a projection 124a thereof is caused to engage detent means 174, said engagement effecting a movement of element 106 toward the right and away from the plane of the film, said element 106 being thus releasably held and permitting an unobstructed passage for insertion of another film into the camera.

The modification of pressure applying means shown in Fig. 5 represents a similar construction to that of Fig. 3 with the sole exception that element 88 thereof is supplanted by a nonresilient element 176 extending across a surface of the film, said element 176 having been brought to a position, by adjustment means similar to those shown in Fig. 3, providing a predetermined spacing of its extremity from fixed plate 178. Film 12 is drawn between said elements or, alternatively, a modification of mechanism such as that shown in Fig. 4 may be employed to draw said element 176 across a surface of the film whereby a fluid containing portion of the film exceeding other portions thereof in width, and thus intercepting the pressure applying elements and the tendency of the film to expand outwardly when the fluid is forced between its layers so interact in conjunction with the spacially fixed elements 176 and 178 as to cause release and spreading of said fluid between layers of the film when said elements or film are moved as previously described.

In the several film holding means shown it is to be noted that film engaging portions thereof are so designed as to engage either edge and marginal portions of the film or edge portions and marginal portions of one film surface and substantially the entire opposite film surface. The aforesaid constructions obviate the possibility of pressure being applied to fluid containing portions of the film by said holding means when the film is introduced thereinto and thus eliminate the possibility of premature release of the fluid.

It will be understood that further combinations of the elements described or modifications thereof may be employed within the scope of the invention as, for example, incorporation of modified pressure applying means such as the embodiment of a spring-biased plate in place of plate 178 of Fig. 5, or the employment of a single rigid element having an angled or rounded surface portion around which the multilayer film may be drawn at a predetermined tension, an outer layer or layers of the film coacting with said rigid element for applying pressure to inner film portions. It will also be apparent that various devices may be utilized for actuating movement of the mechanisms described as, for example, the employment of a motor in the modification of Fig. 4 and the use of such means as a movable rack, a chain belt, or a cable for effecting movement of the carriers thereof. Wherein a carrier is shown for moving the film said carrier principally serves as holding means which contribute to passage of the film past pressure applying means without undergoing sideways displacement or longitudinal slippage and also offers convenient means for operation of a speed governor. The carrier is thus a preferable embodiment but not essential to the fluid spreading operations described in conjunction with the use thereof. Without use of the carrier, it will be understood that the film itself may, for example, be manually moved longitudinally, substantially within predefined transverse limits, as, for example, between suitable track or guide means, and that pressure applying means per se serve to prevent displacement of the film in a direction perpendicular to the plane of said film. While given pressure applying means are shown as adapted to both release and spread the fluid between film surfaces, said means may be restricted to the spreading function and separate means may be embodied in the apparatus for releasing said fluid.

Although the forms of camera apparatus shown accommodate but a single film unit suitable magazine means for supplying a plurality of film units could be incorporated therewith or, as previously stated, pressure applying elements of the general type described are adapted functionally to use with roll film. It will be apparent that the pressure applying mechanisms of the invention are not limited to inclusion in a complete camera apparatus but could be mounted in a darkroom for processing a quantity of exposed film or mounted in the form of an attachment for a camera of substantially conventional design by providing suitable means for moving exposed film therefrom to engagement with said mechanisms.

Since certain changes in the construction set forth which embody the invention may be made without departing from its scope, it is intended that all matter contained in the above description or shown in the accompanying drawings shall be interpreted as illustrative and not in a limiting sense.

What is claimed is:

1. Apparatus for exposing and processing a photosensitive film material comprising, in combination, means comprising a frame-like film carrier for receiving and supporting both said film material and another sheet material in superimposed relation, said superimposed materials having a film-processing fluid contained between a predetermined area of their outer surfaces, means comprising a holder for slidably mounting said carrier means and adapted to position said film for subjection to a processing treatment, means for photoexposing said film material while the latter is held by said carrier means in said holder, pressure-applying means for engaging at least a surface of said materials and applying a compressive force thereto, and means for mounting said pressure-applying means and said carrier means for movement relative to each other, said pressure-applying means being located by said mounting means to engage said superimposed materials during said relative movement to apply compression to successive portions of said materials to cause the liquid contained therein to be released and to permeate the photosensitive layer of the photosensitive film material.

2. Apparatus for exposing and processing a photosensitive film material comprising, in combination, means comprising a frame-like film carrier for receiving and supporting both said film material and another sheet material in superimposed relation, said superimposed materials having a film-processing fluid contained between a predetermined area of their outer surfaces, means comprising a holder for slidably mounting said carrier means and adapted to position said film for subjection to a processing treatment, means for photoexposing said film material while the latter is held by said carrier means in said holder, pressure-applying means for engaging at least a surface of said materials and applying a compressive force thereto, and means for mounting said pressure-applying means to fix the position thereof relative to said holder means, said pressure-applying means being so located as to engage at least a surface of said superimposed materials during slidable movement of said carrier within said holder means to apply compression to successive portions of said materials to cause the liquid contained therein to be released and to permeate the photosensitive layer of the photosensitive film material.

3. Apparatus for exposing and processing a photosensitive film material comprising, in combination, means comprising a frame-like film carrier for receiving and supporting both said film material and another sheet material in superimposed relation, said superimposed materials having a film-processing fluid contained between a predetermined area of their outer surfaces, means comprising a holder for slidably mounting said carrier means and adapted to position said film for subjection to a processing treatment, means for photoexposing said film material while the latter is held by said carrier means in said holder, pressure-applying means comprising a member for engaging at least a surface of said materials and applying a compressive force thereto, and means for pivotally mounting said member upon said holder means and for resiliently biasing said member, said means so locating and so biasing said member that said member engages said superimposed materials during slidable movement of said carrier within said holder means to apply compression to successive portions of said materials to cause the liquid contained therein to be released and to permeate the photosensitive layer of the photosensitive film material.

4. Apparatus for exposing and processing a photosensitive film material comprising, in combination, means comprising a frame-like film carrier for receiving and supporting both said film material and another sheet material in superimposed relation, said superimposed materials having a film-processing fluid contained between a predetermined area of their outer surfaces, means mounted upon a transverse member of said film carrier for clamping said materials therewithin, said clamping means comprising a pair of members adapted to be grasped by the operator for applying a clamping pressure upon said materials and for moving said carrier with respect to fixed portions of said apparatus, means comprising a holder for slidably mounting said carrier means and adapted to position said film for subjection to a processing treatment, means for photoexposing said film material while the latter is held by said carrier means in said holder, pressure-applying means comprising a plate-like member for engaging at least a surface of said materials and applying a compressive force thereto, and means for pivotally mounting said member upon said holder means and for resiliently biasing said member, said means so locating and so biasing said member that said member engages said superimposed materials during slidable movement of said carrier within said holder means to apply compression to successive portions of said materials to cause the liquid contained therein to be released and to permeate the photosensitive layer of the photosensitive film material.

5. Apparatus for exposing and processing a photosensitive film material comprising a frame-like film carrier for receiving and supporting both said film material and another sheet material in superimposed relation, said superimposed materials having a film-processing fluid contained between a predetermined area of their outer surfaces, means comprising a holder for slidably mounting said carrier for movement relative thereto, said holder guiding said carrier to a position for photographic exposure of the film and through other positions for subjection to a processing treatment, means for exposing said film to actinic light when said materials have been carried to said exposure position, pressure-applying means comprising a rigid, bladelike member for engaging at least a surface of said materials and applying a compressive force thereto, and means for mounting said pressure-applying means to fix the position thereof relative to said holder means, said pressure-applying means being so located as to engage at least a surface of said superimposed materials during slidable movement of said carrier within said holder means to apply compression to successive portions of said materials to cause the liquid contained therein to be released and to permeate the photosensitive layer of the photosensitive film material.

6. Apparatus for exposing and processing a photosensitive film material comprising, in combination, means comprising a frame-like film carrier for receiving and supporting both said film material and another sheet material in superimposed relation, said superimposed materials having a film-processing fluid contained between a predetermined area of their outer surfaces, means comprising a holder for mounting said carrier for slidable movement relative thereto, said holder guiding said carrier to a position for photographic exposure of the film and through other positions for subjection to a processing treatment, means for exposing said film to actinic light when said materials have been carried to said exposure position, pressure-applying means comprising a pair of members capable of being spaced and fixed at a predetermined distance apart for engaging opposite surfaces of said materials and applying a compressive force thereto, and means for fixedly mounting said members relative to said holder means on opposite sides of said carrier to engage opposite surfaces of said materials during slidable movement of said carrier within said holder means to apply compression to successive portions of said materials.

7. Apparatus for exposing and processing a photosensitive film material comprising, in combination, means comprising a frame-like film carrier for receiving and supporting both said film material and another sheet material in superimposed relation, said superimposed materials having a film-processing fluid contained between a predetermined area of their outer surfaces, means comprising a holder for slidably mounting said carrier for translational movement relative thereto, said holder guiding said carrier to a position for photographic exposure of the film and through other positions for subjection to a processing treatment, means for exposing said film to actinic light when said materials have been carried to said exposure position, means comprising at least a plate-like member fixed against rotation for engaging at least a surface of said materials and applying a compressive force thereto, means for fixedly mounting said platelike member relative to said holder means in a position to engage said materials during slidable movement of said carrier within said holder means to apply compression to successive portions of said materials, and means comprising a speed governor and suitable mechanism connecting said governor and carrier means for controlling the speed at which said last-named means may be moved.

8. Apparatus for predeterminedly treating a photosensitive film material, comprising, in combination, means constituting a carrier for said film material comprising at least a pair of parallel surfaces adapted to slidably engage other surfaces of the apparatus, said carrier means being adapted to receive and to firmly hold both said film material and another sheet material in superimposed relation to one another, said materials having a film-processing fluid contained between a predetermined area of their outer surfaces extending transversely thereof, said carrier means being adapted to so engage portions of said materials as to permit an area of said film to remain unobstructed for exposure and treatment, holder means adapted to receive said carrier comprising at least a pair of parallel surfaces adapted to slidably engage said carrier surfaces and to permit slidable movement of said carrier relative thereto, means for photoexposing said area of film material while the same is held by said carrier means in said holder means, and means fixed with respect to said holder means adapted to compressively bear against successive surface portions of said materials carried by the carrier while said carrier is slidably moved within the holder means to provide a compression of said materials and a flow of the processing fluid therebetween, a pair of the aforesaid parallel surfaces of at least one of said carrier means and holder means being of a length sufficient to provide slidable engagement of said pair of surfaces with the other pair of surfaces while at least an entire exposed area of the film is caused to be moved with respect to said compressive means and to be subjected to compression thereby.

9. Apparatus for predeterminedly treating a photosensitive film material, comprising, in combination, means comprising a carrier adapted to receive and to firmly hold both said film material and another sheet material in superimposed relation to one another, said materials having a film-processing fluid contained between a predetermined area of their outer surfaces extending transversely thereof, said carrier comprising a plurality of members formed to engage portions of said materials and to permit an area of said film to remain unobstructed for exposure and treatment, holder means adapted to receive said carrier comprising a plurality of members formed to engage a plurality of members of the carrier and to permit translatory movement of said carrier relative thereto, means for photoexposing said area of film material while the same is held by said carrier means in said holder means, and means fixed with respect to said holder means adapted to compressively bear against successive surface portions of said materials carried by the carrier while said carrier is moved translationally within the holder means to provide a compression of said materials and a flow of the processing fluid therebetween, the aforesaid members of at least one of said carrier means and holder means being of a length sufficient to provide engagement of said members with the members of the other means while at least an entire exposed area of the film is caused to be moved with respect to said compressive means and to be subjected to compression thereby.

10. Apparatus for predeterminedly treating a photosensitive film material, comprising, in combination, means comprising a carrier adapted to receive and to firmly hold both said film material and another sheet material in superimposed relation to one another, said materials having a film-processing fluid contained between a predetermined area of their outer surfaces extending generally transversely thereof, said carrier comprising a plurality of members formed to engage portions of said materials and to permit an area of said film to remain unobstructed for exposure and treatment, holder means adapted to receive said carrier comprising a plurality of members formed to engage a plurality of members of the carrier and to permit translatory movement of said carrier relative thereto, means for photoexposing said area of film material while the same is held by said carrier means in said holder means, and means fixed with respect to said holder means comprising at least a substantially hard and smooth surfaced member fixed against rotation and formed to slide readily across and to compressively bear against successive surface portions of said materials carried by the carrier while said carrier is moved translationally within the holder means to provide a compression of said materials and a flow of the processing fluid therebetween, the aforesaid members of one of said carrier means and holder means being in the form of a track having a length sufficient to provide engagement of said members with the members of the other means while at least an entire exposed area of the film is caused to be moved with respect to said compressive means and to be subjected to compression thereby.

11. Apparatus for predeterminedly treating a photosensitive film material, comprising, in combination, means comprising a carrier adapted to receive and to firmly hold both said film material and another sheet material in superimposed relation to one another, said materials having a film-processing fluid contained between a predetermined area of their outer surfaces extending transversely thereof, said carrier comprising a plurality of members formed to engage portions of said materials and to permit an area of said film to remain unobstructed for exposure and treatment, holder means comprising a plurality of members formed to engage a plurality of members of the carrier, said holder means slidably mounting said carrier for translatory movement of said carrier relative thereto, means for photoexposing said area of film material while the same is held by said carrier means in said holder means, and means fixed with respect to said holder means comprising at least a bodily movable, substantially hard, and smooth surfaced plate-like member, said member being fixed against rotation, normally biased toward said carrier and formed to slide readily across and to compressively bear against successive surface portions of said materials carried by the carrier while said carrier is moved translationally within the holder means to provide a compression of said materials and a flow of the processing fluid therebetween, the aforesaid members of at least one of said carrier means and holder means being in the form of a channel having a length sufficient to provide engagement of said members with the members of the other means while at least an entire exposed area of the film is caused to be moved with respect to said compressive means and to be subjected to compression thereby.

12. Apparatus for predeterminedly treating a photosensitive film material, comprising, in combination, means comprising a carrier adapted to receive and to firmly hold both said film material and another sheet material in superimposed relation to one another, said materials having a film-processing fluid contained between a predetermined area of their outer surfaces extending transversely thereof, said carrier comprising a plurality of members formed to engage portions of said materials and to permit an area of said film to remain unobstructed for exposure and treatment, holder means comprising a plurality of members formed to engage a plurality of members of the carrier, said holder means slidably mounting said carrier for translatory movement of said carrier relative thereto, means for photoexposing said area of film material while the same is held by said carrier means in said holder means, and means fixed with respect to said holder means comprising a pair of substantially hard and smooth surfaced plate-like members, fixed against rotation, at least one of said members being pivotally mounted and biased toward said carrier, said means being adapted to compressively bear against successive surface portions of said materials carried by the carrier while said carrier is moved within the holder means to provide a compression of said materials and a flow of the processing fluid therebetween, the aforesaid members of at least one of said carrier means and holder means being formed to provide a continuous engagement of said members with the members of the other means while at least an entire exposed area of the film is caused to be moved with respect to said compressive means and to be subjected to compression thereby.

13. Apparatus for predeterminedly treating a photosensitive film material comprising, in combination, means comprising a frame-like member adapted to have said film material slidably positioned therewithin for exposure to actinic light and subjection to a processing treatment while said film material is assembled in superimposed relation with another sheet material, said materials having a film-processing fluid contained between a predetermined substantially transverse area of their outer surfaces, means for releasably clamping said assembled materials within said frame-like member, means for photoexposing said photosensitive film material while the same is held in said frame-like member, means comprising at least a plate-like member for applying a compressive force to said assembled materials, and means for mounting said platelike member to fix the same against rotation and to establish the position thereof relative to said holder means so that upon relative movement of said frame-like member and said platelike member the plate-like member applies compression to successive portions of the assembled material to cause the liquid contained therein to be released and to permeate the photosensitive layer of the photosensitive film material, said platelike member being resiliently biased in the direction of said materials during said relative movement.

14. Apparatus for predeterminedly treating a photosensitive film material, comprising, in combination, means forming a carrier for said film material comprising a plurality of parallel surfaces adapted to slidably engage other surfaces of the apparatus and a plate-like member adapted to support said film material and another sheet material in superimposed relation to one another, said materials having a film-processing fluid contained between a predetermined area of their outer surfaces extending transversely thereof, means associated with said carrier comprising a clamping member for holding said superimposed materials firmly against said plate-like member, said clamping member and said plate-like member being adapted to so engage portions of said materials as to permit an area of said film to remain unobstructed for exposure and treatment, a holder means adapted to receive said carrier comprising a plurality of parallel surfaces adapted to slidably engage said carrier surfaces and to permit slidable movement of said carrier relative thereto, means for photoexposing said area of film material while the same is held by said carrier means in said holder means, and means fixed with respect to said holder means adapted to bear against successive surface portions of said materials carried by the carrier and to compress said portions against said plate-like member while said carrier is slidably moved within the holder means to provide a compression of said materials and a flow of the processing fluid therebetween, the aforesaid parallel surfaces of at least one of said carrier means and holder means being of a length sufficient to provide slidable engagement of said surfaces with the surfaces of said other means while at least an entire exposed area of the film is caused to be moved with respect to said compressive means and to be subjected to compression thereby.

15. Apparatus for predeterminedly treating a photosensitive film material, comprising in combination, means comprising a carrier adapted to receive and to firmly hold both said film material and another sheet material in superimposed relation to one another, said materials having a film-processing fluid contained between a predetermined area of their outer surfaces extending transversely thereof, said carrier being formed to provide a rigid frame defining an opening, said frame substantially surrounding an area of said film which is adapted to be exposed to actinic light and said opening providing access to said film for treatment thereof, means comprising a holder having at least a member adapted to receive a complementary member of said carrier and to permit translatory movement of said carrier relative thereto, means for photoexposing said area of film material while the same is held by said carrier means in said holder means, and means fixed with respect to said holder means adapted to be inserted in said opening in the carrier and to compressively bear against successive surface portions of said materials carried by the carrier when said carrier is moved translationally relative to the holder to provide a compression of said materials and a flow of the processing fluid therebetween, the aforesaid member of the holder along which said complementary member of the carrier is adapted to be moved being of a length relative to said last-named member enabling translatory movement of said carrier sufficient to permit at least a framed area of exposed film to be subjected to said compressive means.

16. Apparatus for exposing and processing a photographic film in conjunction with another sheet material which is superposed with said film and in conjunction with a processing fluid which is located between said film and said other sheet material when the latter are superposed, said apparatus comprising, in combination, a housing, means comprising an exposure opening and capable of exposing a film in said housing, means for supporting said film in said housing in position for exposure by said exposure means and for supporting said film in superposed relation with said sheetlike material with said fluid therebetween, pressure-applying means, and means for mounting said film-supporting means and said pressure-applying means so that said pressure-applying means and said superposed materials are capable of movement relative to one another, said pressure-applying means comprising a blade-like element which extends transversely across a part at least of one dimension of said superposed materials and is adapted to press against a surface of said superposed materials, during relative movement between said materials and said compression-applying means, to cause the fluid carried therebetween to permeate the photosensitive layer of said film.

17. Apparatus for exposing and processing a photographic film in conjunction with another sheet material which is superposed with said film and in conjunction with a processing fluid which is located between said film and said other sheet material when the latter are superposed, said apparatus comprising, in combination, a housing, means comprising an exposure opening and capable of exposing a film in said housing, means for supporting said film in said housing in position for exposure by said exposure means and for supporting said film in superposed relation with said sheetlike material with said fluid therebetween, pressure-applying means, and means for mounting said film-supporting means and said pressure-applying means so that said pressure-applying means and said superposed materials are capable of movement relative to one another, said pressure-applying means comprising a yieldable bladelike element which extends transversely across a part at least of one dimension of said superposed materials and is adapted to press against a surface of said superposed materials, during relative movement between said materials and said compression-applying means, to cause the fluid carried therebetween to permeate the photosensitive layer of said film.

18. Apparatus for exposing and processing a photographic film in conjunction with another sheet material which is superposed with said film and in conjunction with a processing fluid which is located between said film and said other sheet material when the latter are superposed said apparatus comprising, in combination, a housing, means comprising an exposure opening and capable of exposing a film in said housing, means for supporting said film in said housing in position for exposure by said exposure means and for supporting said film in superposed relation with said sheetlike material with said fluid therebetween, pressure-applying means, and means for mounting said film-supporting means and said pressure-applying means so that said pressure-applying means and said superposed materials are capable of movement relative to one another, said pressure-applying means comprising a rigid bladelike element which extends transversely across a part at least of one dimension of said superposed materials and is adapted to press against a surface of said superposed materials, during relative movement between said materials and said compression-applying means, to cause the fluid carried therebetween to permeate the photosensitive layer of said film.

19. Apparatus for exposing and processing a photographic film in conjunction with another sheet material which is superposed with said film and in conjunction with a processing fluid which is located between said film and said other sheet material when the latter are superposed, said apparatus comprising, in combination, a housing, means comprising an exposure opening and capable of exposing a film in said housing, means for supporting said film in said housing in position for exposure by said exposure means and for supporting said film in superposed relation with said sheetlike material with said fluid therebetween, means capable of cooperating with an element of said supporting means for applying compression to said superposed materials, said cooperating element of said supporting means providing a backing surface for said sheet materials coextensive with the area thereof to be processed, and means for mounting said compression-applying means relative to said film-supporting means so that said compression-applying means and said backing surface are capable of movement relative to one another with said superposed materials therebetween, said compression-applying means comprising a bladelike element which extends transversely across a part at least of one dimension of said superposed materials and is adapted to engage a surface of said superposed materials during relative movement between said materials and said means to press said materials against said backing surface to cause the fluid carried therebetween to permeate the photosensitive layer of said film.

20. Apparatus for exposing and processing a photographic film in conjunction with another sheet material which is superposed with said film and in conjunction with a processing fluid which is located between said film and said other sheet material when the latter are superposed, said apparatus comprising, in combination, a housing, means comprising an exposure opening and capable of exposing a film in said housing, means for supporting said film in said housing in position for exposure by said exposure means and for supporting said film in superposed relation with said sheetlike material with said fluid therebetween, pressure-applying means, and means for mounting said film-supporting means and said pressure-applying means so that said pressure-applying means and said superposed materials are capable of movement relative to one another, said pressure-applying means comprising a pair of bladelike elements which extend transversely across a part at least of one dimension of said superposed materials in opposite sides of said materials, said bladelike elements being adapted to engage opposite surfaces of said superposed materials and during relative movement between said materials and said pressure-applying means to apply compression to said materials to cause the fluid carried therebetween to permeate the photosenstive layer of said film.

21. Apparatus for exposing and processing a photographic film in conjunction with another sheet material which is superposed with said film and in conjunction with a processing fluid which is located between said film and said other sheet material when the latter are superposed, said apparatus comprising, in combination, a housing, means comprising an exposure opening and capable of exposing a film in said housing, means for supporting said film in said housing in position for exposure by said exposure means and for supporting said film in superposed relation with said sheetlike material with said fluid therebetween, pressure-applying means, means for mounting said film-supporting means and said pressure-applying means so that said pressure-applying means and said superposed materials are capable of movement relative to one another, said pressure-applying means comprising a pair of bladelike elements which extend transversely across a part at least of one dimension of said superposed materials and on opposite sides of said superposed materials, mechanism for mounting each of said bladelike elements for pivotal movement relative to said materials, and resilient means for biasing each said bladelike element in the direction of said materials, said bladelike elements acting during relative movement between said materials and said pressure-applying means to apply compression to said materials and to cause the fluid carried therebetween to permeate the photosensitive layer of said film.

EDWIN H. LAND.

(References on following page)

REFERENCES CITED

The following references are of record in the file of this patent:

UNITED STATES PATENTS

| Number | Name | Date |
|---|---|---|
| 159,035 | Moestue | Jan. 26, 1875 |
| 344,781 | Hulbert | June 29, 1886 |
| 777,147 | Sanderson | Dec. 13, 1904 |
| 2,380,378 | Allen | July 31, 1945 |

FOREIGN PATENTS

| Number | Country | Date |
|---|---|---|
| 29,653 | Austria | Aug. 2, 1907 |
| 470,197 | Great Britain | Aug. 11, 1937 |